(12) United States Patent
Mayer Pujadas et al.

(10) Patent No.: US 10,938,098 B2
(45) Date of Patent: *Mar. 2, 2021

(54) RADOME FOR VEHICLES

(71) Applicant: ZANINI AUTO GRUP, S.A., Parets del Valles (ES)

(72) Inventors: Augusto Mayer Pujadas, Barcelona (ES); José Sanahuja Clot, Barcelona (ES)

(73) Assignee: ZANINI AUTOGRUP, S.A., Barcelona (ES)

( * ) Notice: Subject to any disclaimer, the term of this patent is extended or adjusted under 35 U.S.C. 154(b) by 0 days.

This patent is subject to a terminal disclaimer.

(21) Appl. No.: 16/474,230

(22) PCT Filed: Dec. 28, 2016

(86) PCT No.: PCT/EP2016/082764
§ 371 (c)(1),
(2) Date: Jun. 27, 2019

(87) PCT Pub. No.: WO2018/121855
PCT Pub. Date: Jul. 5, 2018

(65) Prior Publication Data
US 2019/0356046 A1  Nov. 21, 2019

(51) Int. Cl.
*H01Q 1/42* (2006.01)
*H01Q 1/32* (2006.01)
*B60Q 1/00* (2006.01)

(52) U.S. Cl.
CPC ............. *H01Q 1/42* (2013.01); *B60Q 1/0011* (2013.01); *H01Q 1/3233* (2013.01); *H01Q 1/3283* (2013.01)

(58) Field of Classification Search
CPC . B60R 13/005; B60R 19/52; B60R 2019/525; B60Q 1/2661; F21S 41/30;
(Continued)

(56) References Cited

U.S. PATENT DOCUMENTS 2,595,331 A * 5/1952 Calihan ................ B60Q 1/2665
362/494
5,806,957 A * 9/1998 Prior ..................... B60R 13/005
362/267
(Continued)

FOREIGN PATENT DOCUMENTS

| DE | 102014002438 A1 | 8/2015 |
| EP | 1650053 A1 | 4/2006 |
| WO | 2012/066417 A1 | 5/2012 |

OTHER PUBLICATIONS

International search report for PCT/EP2016/082764, dated Sep. 25, 2017, 1 pages.
(Continued)

*Primary Examiner* — Rajarshi Chakraborty
*Assistant Examiner* — Fatima N Farokhrooz
(74) *Attorney, Agent, or Firm* — Danielson Legal LLC

(57) ABSTRACT

The radome (10) for vehicles comprises a substrate (18) formed of a radio transmissive resin, the substrate (18) having a proximal face and a distal face and a decoration layer (20) applied to the proximal face, the decoration layer (20) comprising a metalloid or a metalloid alloy deposited on the surface of the proximal face, a transparent frontal cover (22) overlying the decoration layer (20), and a light source (11) that illuminates the substrate (18), so that the light from the light source (11) crosses the transparent frontal cover (22). It permits to maintain its metallic aspect in any lighting condition, so that the decorative function is be improved by adding illumination in appropriate conditions while preserving the radar functionality.

13 Claims, 3 Drawing Sheets

(58) Field of Classification Search
CPC .......... F21V 3/02; C23C 14/20; C23C 14/35; F21Y 2115/10; F21W 2121/00
See application file for complete search history.

(56) References Cited

U.S. PATENT DOCUMENTS

| | | | |
|---|---|---|---|
| 2004/0080958 A1* | 4/2004 | Bukosky | B60Q 1/2665 362/494 |
| 2007/0114322 A1* | 5/2007 | Smereczniak | B64C 30/00 244/1 N |
| 2008/0063874 A1* | 3/2008 | Rakow | G01N 21/77 428/426 |
| 2008/0149318 A1 | 6/2008 | Dakhoul | |
| 2008/0309579 A1 | 12/2008 | Maeda et al. | |
| 2010/0321952 A1* | 12/2010 | Coleman | G02B 6/0061 362/607 |
| 2012/0119961 A1* | 5/2012 | Mayer Pujadas | H01Q 1/38 343/713 |
| 2012/0294030 A1* | 11/2012 | Okada | F21S 43/31 362/602 |
| 2012/0320615 A1* | 12/2012 | Englert | G09F 13/04 362/511 |
| 2013/0201709 A1* | 8/2013 | Natsume | B60Q 1/00 362/511 |
| 2015/0025788 A1* | 1/2015 | Crain | G01S 13/90 701/400 |
| 2015/0349399 A1* | 12/2015 | Lasier | H01Q 1/1242 343/721 |
| 2017/0023723 A1* | 1/2017 | Tanaka | B60Q 1/2661 |
| 2017/0352938 A1 | 12/2017 | Okumura et al. | |
| 2017/0357044 A1* | 12/2017 | Kuramitsu | G02B 6/0088 |
| 2018/0254551 A1* | 9/2018 | Guretzky | G01S 7/032 |

OTHER PUBLICATIONS

Office Action for U.S. Appl. No. 16/344,351, dated Aug. 18, 2020, 10 pages.
Office Action for U.S. Appl. No. 16/556,748, dated Dec. 1, 2020, 13 pages.

* cited by examiner

RADOME FOR VEHICLES

CROSS REFERENCE TO RELATED APPLICATIONS

This application is the national phase of International (PCT) Patent Application No. PCT/EP2016/082764, filed internationally on Dec. 28, 2016, the entire disclosure of which is hereby incorporated by reference in its entirety.

The present invention refers to a radome for protecting a radar device while presenting a decorative metallic image, especially for radar devices disposed behind the front grill of an automobile.

BACKGROUND OF THE INVENTION

In general, radio transmitter-receiver devices, such as a millimeter-wave radar, have been employed as sensors for vehicular collision avoidance and adaptive cruise control systems.

In a radar system or the like that measures obstacles in front of an automobile and the distance between automobiles, the antenna was preferably positioned in the center at the front of the vehicle to obtain maximum performance. Although the radar antenna could be installed near the front grill of automobile, it was preferable to conceal the antenna from view due to its non-aesthetic appearance and to shield the antenna from external environmental factors such as weather and airborne contaminants.

In order protect the antenna and avoid radio interference and signal losses of the radar device, it has been proposed to provide a radar window capable of transmitting radio waves in the front grill corresponding where the radar antenna was located. This allowed radio waves to pass in and out through the window. However, the radar window diminished the appearance of the front grill due to the interruption of the pattern of the grill structural elements. Further, unsightly internal portions of the vehicle, like the radar transmitter-receiver, could be seen through the radar window.

WO2012066417A1, in the name of the same applicant than the present application, discloses a decorative radome comprising a substrate made of a radio transmissive resin, a decoration layer comprising a plurality of metalloid or metalloid alloy (Si, Ge) layers applied to the substrate proximal face, a radio transmissive resin overlying the decoration layer, the resin overlying the decoration layer including a decoration ink overlay. However, in this radome, its metallic aspect can be lost in the absence of ambient light.

Therefore, the object of the present invention is to overcome this drawback, providing other advantages that will be disclosed hereinafter, so that the decorative function can be improved by adding illumination in appropriate conditions while preserving the radar functionality.

SUMMARY OF THE INVENTION

The radome for vehicles according to the present invention comprises:
a substrate formed of a radio transmissive and light diffusing resin, the substrate having a proximal face and a distal face and a decoration layer applied to the proximal face, the decoration layer comprising a metalloid or a metalloid alloy deposited on the surface of the proximal face,
a transparent frontal cover overlying the decoration layer, and
a light source that illuminates the substrate, so that the light from the light source crosses the transparent frontal cover.

Preferably, the radome for vehicles according to the present invention also comprises a rear transparent cover, and the light source is placed in said rear transparent cover in such a way that the coupling of the light source on the rear transparent cover is maximized. So the light rays can propagate freely and unobstructed inside the whole rear transparent cover body before being projected towards the vehicle forward direction.

According to two alternative embodiments, the decoration layer is translucent, or the decoration layer is opaque and it is applied only to a portion of the proximal face of the substrate leaving gaps for the passage of light from the light source.

Advantageously, the rear transparent cover comprises an optical reflective coating on its side opposite to the substrate, for reflecting the light from the light source towards the vehicle forward direction.

Preferably, the transparent frontal cover comprises at least one pad or decoration on one or more its portions on the side in contact with the substrate.

It must be pointed out that said metalloid or the metalloids of the alloy are selected from Germanium, Boron, Silicon, Arsenic, Antimony and/or Tellurium.

The present invention also refers to a vehicle including a radome as described previously, including a front grill assembly, the radome being positioned within the grill assembly, the vehicle further including a radar antenna positioned behind and in registration with the radome.

The technical advantage of the radome of the present invention is that its metallic aspect is maintained in any lighting condition, so that the decorative function is be improved by adding illumination in appropriate conditions while preserving the radar functionality.

DESCRIPTION OF A PREFERRED EMBODIMENT

First of all, in the present specification and in the attached claims by the term "metalloid" is meant any of the following compounds: Germanium, Boron, Silicon, Arsenic, Antimony and/or Tellurium.

Radomes cover microwave antennas to protect the antennas from rain, ice, wind and other environmental conditions and are also provided to conceal the antennas form view. A principal requirement is that the radome be transparent to radar or radio waves or provide but minimal signal attenuation.

PVD magnetron sputtering is the method employed for the deposition of metalloid over a substrate. Due to the nature of sputtering deposition, uniformity of the decoration layer can be guaranteed.

Figure 1:
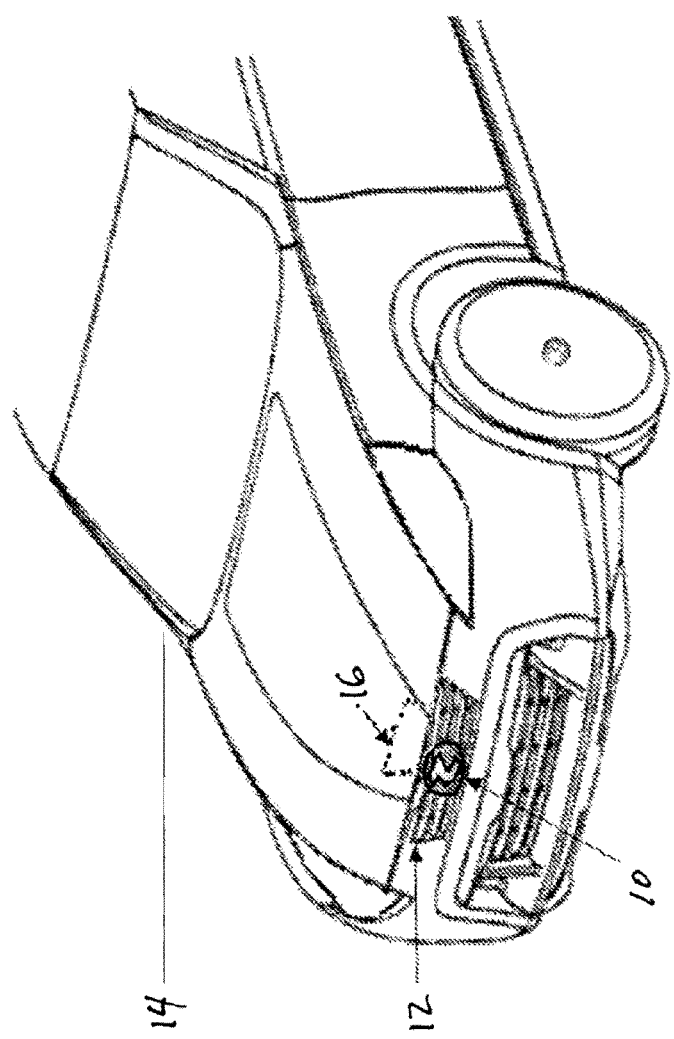
FIG. 1 is a perspective view of a vehicle provided with the radome according to the present invention.

With reference now in detail to the drawings, wherein like numerals will be employed to denote like components throughout, as illustrated in FIG. 1, the reference numeral 10 denotes generally a decorative radome constructed in accordance with and embodying the invention configured for mounting within a grill assembly 12 of a motor vehicle 14.

Positioned within the vehicle 14 behind and in registration with the decorative radome 10 is a radar antenna 16.

Figure 2:
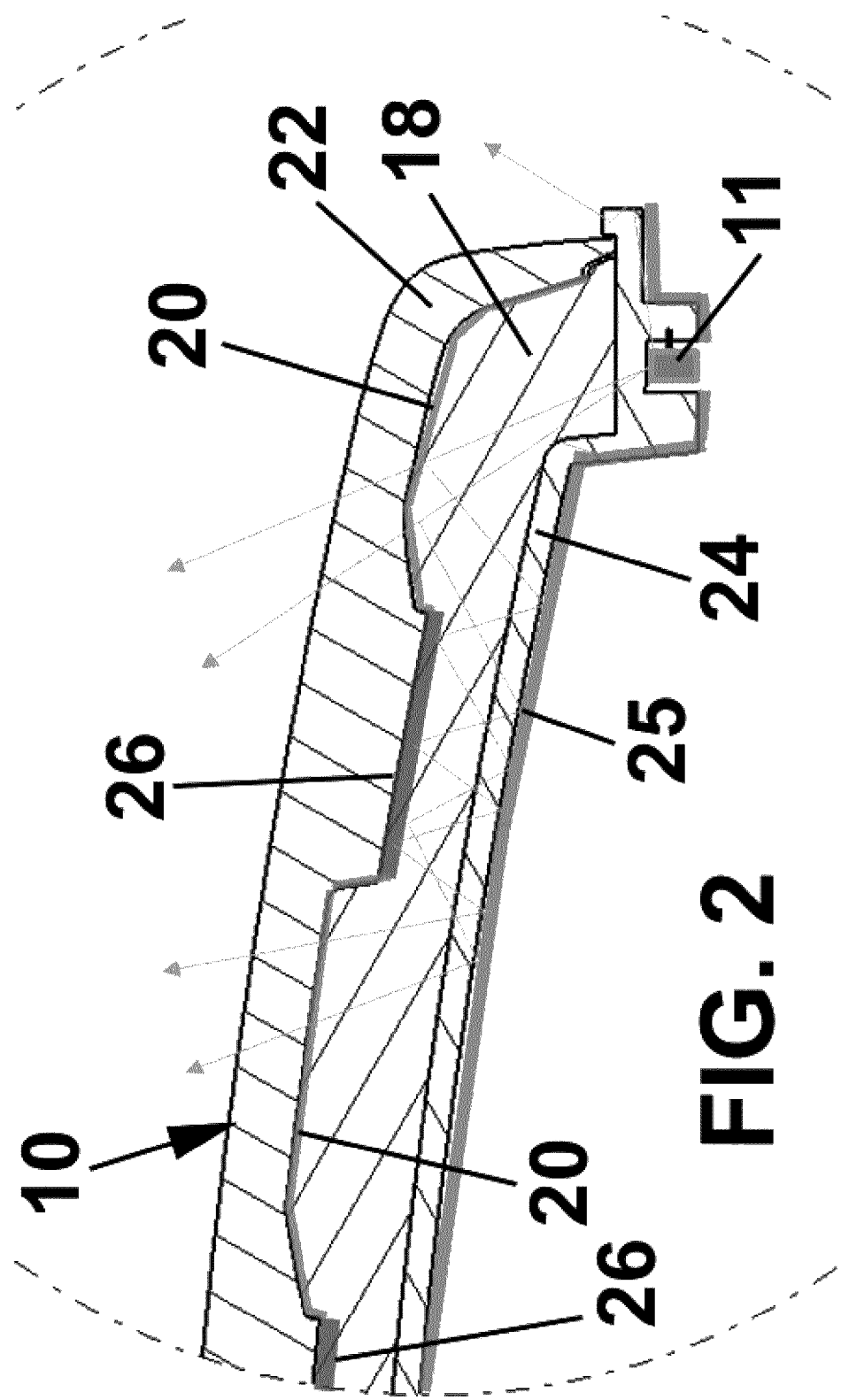
FIG. 2 is a cross-section of a portion of the radome according to present invention, according to a first embodiment.

FIG. 2 is a cross section of the radome 10 according to a first embodiment.

In this first embodiment, the radome 10 comprises a frontal transparent cover 22, that can be made from an injected transparent material with excellent optical properties.

This frontal transparent cover 22 can include one or more pads 26 printed on it, or by any other suitable decoration method such as over-injection or hot stamping, and it can also include indentations and recesses on the internal surface, as shown in FIG. 2.

The radome 10 according to the invention also comprises an intermediate substrate 18, which is preferably injected with a light diffusion material which scatters light, and a decoration layer 20 made from a metalloid or a metalloid alloy, that is preferably coated by PVD Magnetron Sputtering, using a low electrical conductivity element with metallic aspect.

The thickness of the decoration layer 20 is such that light is partially reflected and partially transmitted, but the metallic aspect is clearly visible in daylight conditions.

This intermediate substrate 18 can also include indentations and recesses on one of its surfaces, complimentary to those of the frontal transparent cover 22.

The radome 10 also comprises a rear transparent cover 24, preferably made from injected transparent material, excellent optical properties, and over injected on top of a surface of the substrate 18.

This rear transparent cover 24 also preferably comprises a reflective coating 25 on the distal surface, e.g. applied by PVD Magnetron Sputtering or white reflective paint.

The radome 10 according to the invention also comprises a light source 11, that can be coupled to the rear transparent cover 24, and that can be made from one or more LEDs, or any other suitable light source in terms of intensity and colour.

In this embodiment, the decoration layer 20 is translucent, so that part of the light from the light source 11 can cross this decoration layer 20, as shown by the arrows in FIG. 2.

It must also be pointed out that the radome according to the present embodiment can also comprise a top coat added to the front, or to front and rear radome surfaces, and that the decorations on the front transparent cover (e.g. said one or more pads 26) and on the substrate 18 (said decoration layer 20) are aligned, with no gaps between them.

As shown by the arrows in FIG. 2, the illumination is visible through the decoration coating 20, as part of the light is reflected and part is transmitted.

Furthermore, the radome thickness matches with the semi wavelength of the medium and light source 11 is placed outside the radar field of view to avoid impairments in the radar function.

Figure 3:
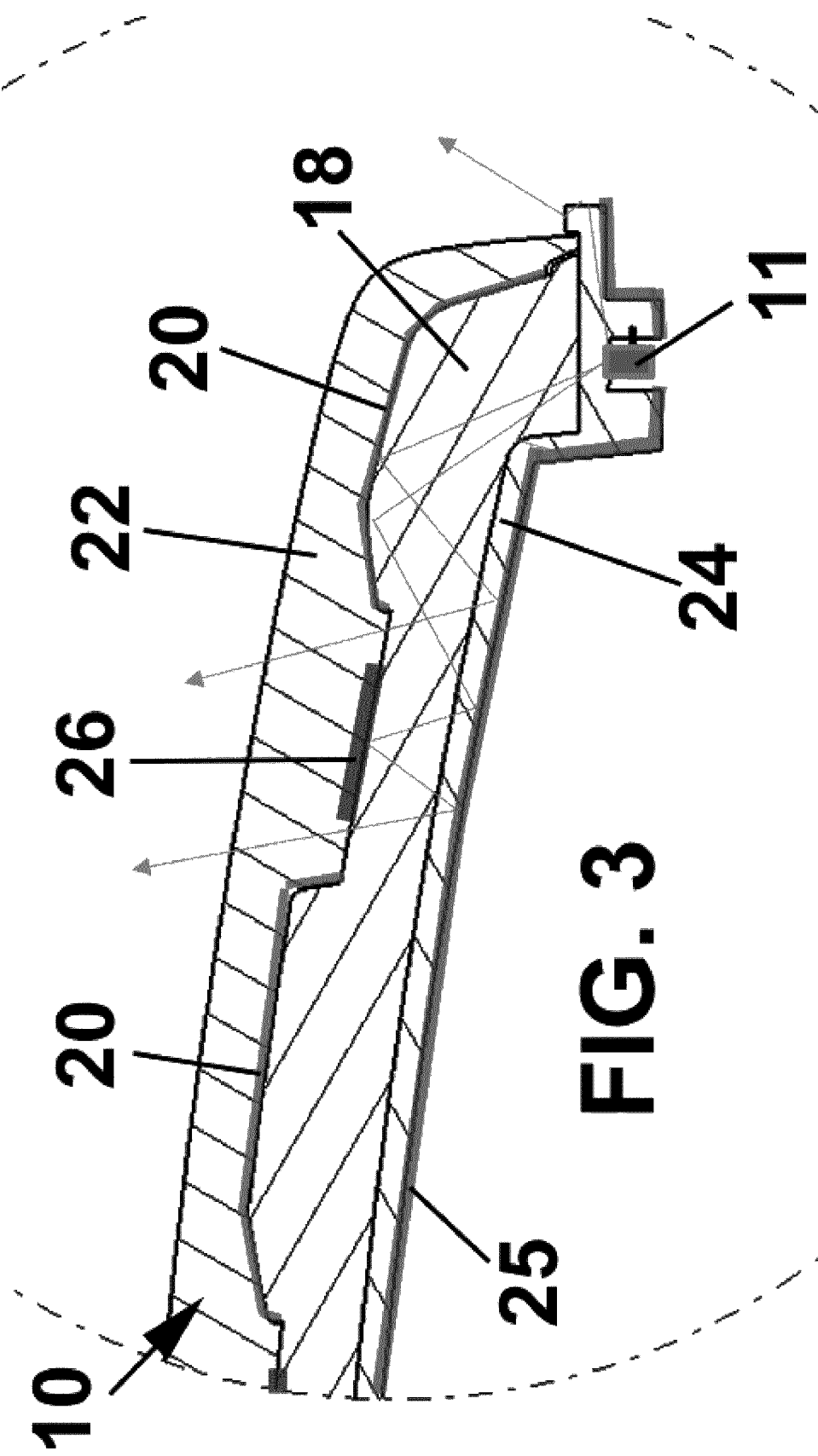
FIG. 3 is a cross-section of a portion of the radome according to present invention, according to a second embodiment.

FIG. 3 shows a second embodiment of the radome 11 according to the present invention.

In this embodiment, the same numeral references are used for identifying the same or equivalent elements for clarity reasons. Furthermore, only the differences between this second embodiment with the first embodiment are described for simplicity reasons.

The main difference from said first embodiment is that the decoration layer 20 is opaque, and reflects the light back to the reflective coating 25 of the rear transparent cover 24.

For this reason, the decoration on the front transparent cover 22 (e.g. said at least one pad 26) and on the substrate 18 (said decoration layer 20) are not aligned, so that there is a gap between them, for instance following any identifiable brand logo shapes.

Therefore, illumination is visible through the existing gap between the decoration layer 20 and the pad(s) 26.

Since various possible embodiments might be made of the present invention and since various changes might be made in the exemplary embodiment shown herein without departing from the spirit of the invention, is to be understood that all matter herein described or shown in the accompanying drawings is to be interpreted as illustrative and not in a limiting sense.

The invention claimed is:

1. A radome (10) for vehicles, comprising:
    a substrate (18) formed of a radio transmissive and light diffusing resin, the substrate (18) having a proximal face, a distal face spaced from and generally paralleling the proximal face, and a decoration layer (20) applied to only a portion of the proximal face leaving translucent gaps along the proximal face, the decoration layer (20) comprising a metalloid or a metalloid alloy deposited on and adhered to the surface of the proximal face,
    a transparent frontal cover (22) overlying the decoration layer (20),
    a rear transparent cover (24) having an optical reflective coating on a side of the rear transparent cover that is opposite to the substrate (18), the rear transparent cover (24) defining a recess along a peripheral region at the side opposite to the substrate; and
    a light source (11) positioned in the recess in the rear transparent cover (24) and configured to illuminate the substrate (18), wherein the light from the light source (11) crosses the transparent frontal cover (22);
    wherein the optical reflective coating is configured to reflect the light from the light source; and
    wherein the decoration layer has a thickness such that the light from the light source is partially reflected by the decoration layer and is partially transmitted through the decoration layer, and wherein light passes from the light source through the translucent gaps.

2. A radome (10) for vehicles according to claim 1, wherein the transparent frontal cover (22) comprises at least one pad (26) on one or more its portions on the side in contact with the substrate (18).

3. A radome (10) for vehicles according to claim 1, wherein said metalloid or the metalloids of the alloy are selected from Germanium, Boron, Silicon, Arsenic, Antimony and/or Tellurium.

4. Vehicle (14) including a radome (10) according to claim 1, including a front grill assembly (12), the radome (10) being positioned within the grill assembly (12), the vehicle (14) further including a radar antenna (16) positioned behind and in registration with the radome (10).

5. The radome (10) of claim 1, wherein the optical reflective coating defines a gap at the recess formed in the rear transparent cover, wherein the optical reflective coating substantially surrounds the recess.

6. The radome (10) of claim 1, wherein other light from the light source is emitted outwardly through the rear transparent cover and is emitted at an outer periphery of the radome without passing through the substrate or the front cover.

7. The radome (10) of claim 1, wherein the rear transparent cover extends laterally outboard of both the substrate and the frontal cover, wherein an outer periphery of the rear transparent cover forms the outermost lateral extent of the radome and comprises an outer end wall that is at least partially reflective, an wherein additional light from the light source is reflected by the outer end wall of the rear transparent cover.

8. The radome (10) of claim 7, wherein the outer periphery of the rear transparent cover extends forwardly of a respective portion of each of the substrate and the frontal cover and defines a forward periphery surface for emitting at least some of the additional light reflected by the outer end wall of the rear transparent cover.

9. A radome for vehicles, the radome comprising:
   a substrate formed of a light diffusing resin, the substrate having a proximal face, a distal face spaced from and generally paralleling the proximal face, and a decoration layer applied to only a portion of the proximal face leaving translucent gaps along the proximal face, the decoration layer comprising a metalloid or a metalloid alloy deposited directly on and adhered to the surface of the proximal face;
   a transparent frontal cover overlying the decoration layer;
   a rear transparent cover having an optical reflective coating on a side of the rear transparent cover that is opposite to the substrate, the rear transparent cover extending laterally outboard of both the substrate and the frontal cover, wherein an outer periphery of the rear transparent cover forms the outermost lateral extent of the radome and comprises an outer end wall that is at least partially reflective; and
   a light source positioned in the rear transparent cover and configured to illuminate the substrate, wherein light from the light source crosses the transparent frontal cover, and wherein additional light from the light source is reflected by the outer end wall of the rear transparent cover;
   wherein the optical reflective coating is configured to reflect the light from the light source; and
   wherein the decoration layer has a thickness such that the light from the light source is partially reflected by the decoration layer and is partially transmitted through the decoration layer, and wherein light passes from the light source through the translucent gaps.

10. The radome of claim 9, wherein the outer periphery of the rear transparent cover extends forwardly of a respective portion of each of the substrate and the frontal cover and defines a forward periphery surface for emitting at least some of the additional light reflected by the outer end wall of the rear transparent cover.

11. The radome of claim 9, wherein the transparent frontal cover comprises at least one pad on one or more its portions on the side in contact with the substrate.

12. The radome of claim 9, wherein the metalloid or the metal of the alloy comprises at least one chosen from Germanium, Boron, Silicon, Arsenic, Aluminum, Zirconium, Titanium, Stainless-steel, Chrome Antimony, and Tellurium.

13. The radome of claim 9, further in combination with a vehicle comprising a front grill assembly, wherein the emblem is positioned within the front grill assembly.

* * * * *